US012584442B2

(12) United States Patent
Urban

(10) Patent No.: US 12,584,442 B2
(45) Date of Patent: Mar. 24, 2026

(54) GAS TURBINE ENGINE WITH ENTRAINED PARTICLE SEPARATION SYSTEM

(71) Applicant: RTX Corporation, Farmington, CT (US)

(72) Inventor: Justin R. Urban, Tolland, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/906,594

(22) Filed: Oct. 4, 2024

(65) Prior Publication Data

US 2025/0116228 A1     Apr. 10, 2025

Related U.S. Application Data

(60) Provisional application No. 63/542,455, filed on Oct. 4, 2023.

(51) Int. Cl.
F02C 7/052          (2006.01)

(52) U.S. Cl.
CPC ........ F02C 7/052 (2013.01); F05D 2260/607 (2013.01)

(58) Field of Classification Search
CPC .............. F02C 7/04; F02C 7/052; F02K 3/06
See application file for complete search history.

(56) References Cited

U.S. PATENT DOCUMENTS

| | | |
|---|---|---|
| 8,539,775 B1 | 9/2013 | Wong |
| 9,631,554 B2 | 4/2017 | Howe |
| 10,227,925 B2 | 3/2019 | Snyder |
| 10,998,958 B1 * | 5/2021 | Gilson ..................... H04B 3/52 |
| 2010/0313639 A1 * | 12/2010 | Khibnik ................. F02C 7/052 |
| | | 73/112.01 |
| 2014/0119891 A1 * | 5/2014 | Schmittenberg .......... F02C 7/05 |
| | | 415/121.2 |
| 2014/0119903 A1 * | 5/2014 | Suciu ..................... F01D 25/08 |
| | | 415/177 |
| 2015/0198090 A1 | 7/2015 | Howe |
| 2018/0193848 A1 | 7/2018 | John |

FOREIGN PATENT DOCUMENTS

GB          2482480 A     2/2012

OTHER PUBLICATIONS

EP Search Report for EP Patent Application No. 24204832.0 dated Feb. 11, 2025.

* cited by examiner

*Primary Examiner* — Nathaniel E Wiehe
*Assistant Examiner* — Jackson N Gillenwaters
(74) *Attorney, Agent, or Firm* — Getz Balich LLC

(57)          ABSTRACT

A turbine engine is provided that includes a fan section, a nose cone, a compressor inlet, a fan duct, and a particle separation system. The fan section has a plurality of fan blades disposed around a circumference of the fan section. The nose cone is disposed forward of the fan section. The compressor inlet is disposed aft of the fan section. The fan duct is disposed radially outside of the compressor inlet. The particle separation system is configured to produce an electrostatic charge on one or more surfaces forward of or adjacent to the compressor inlet. The electrostatic charge is configured to cause charged particles present within an air flow entering the engine to divert from the compressor inlet and enter the fan duct.

19 Claims, 6 Drawing Sheets

GAS TURBINE ENGINE WITH ENTRAINED PARTICLE SEPARATION SYSTEM

This application claims priority to U.S. Patent Appln. No. 63/542,455 filed Oct. 4, 2023, which is hereby incorporated by reference in its entirety.

BACKGROUND OF THE INVENTION

1. Technical Field

The present disclosure relates to gas turbine engines in general and to gas turbine engine including mechanisms for removing entrained particles in particular.

2. Background Information

Particles of various materials such as sand and dust and chemicals that enter a turbine engine can be harmful, for example potentially causing component surface erosion and/or corrosion, clogging of cooling holes and passages, to name a few. Particulate contamination primarily occurs at takeoff and landing due to the higher concentration of dirt particles near the ground. While particulate separation systems exist, there is room for improvement in such systems.

SUMMARY

According to an aspect of the present disclosure, a turbine engine is provided that includes a fan section, a nose cone, a compressor inlet, a fan duct, and a particle separation system. The fan section has a plurality of fan blades disposed around a circumference of the fan section. The nose cone is disposed forward of the fan section. The compressor inlet is disposed aft of the fan section. The fan duct is disposed radially outside of the compressor inlet. The particle separation system is configured to produce an electrostatic charge on one or more surfaces forward of or adjacent to the compressor inlet. The electrostatic charge is configured to cause charged particles present within an air flow entering the engine to divert from the compressor inlet and enter the fan duct.

In any of the aspects or embodiments described above and herein, the particle separation system may be configured to produce the electrostatic charge on an external surface of the nose cone.

In any of the aspects or embodiments described above and herein, the particle separation system may be configured to produce the electrostatic charge on a panel attached to the nose cone.

In any of the aspects or embodiments described above and herein, the panel is electrically insulated from the nose cone.

In any of the aspects or embodiments described above and herein, each fan blade in the fan section (FS) may include a platform and the fan blade platforms may collectively form a FS inner gas path boundary within the fan section, and the particle separation system may be configured to produce the electrostatic charge on the fan blade platforms.

In any of the aspects or embodiments described above and herein, each fan blade in the fan section (FS) may include a platform and a respective panel attached to each respective fan blade platform, and the particle separation system may be configured to produce the electrostatic charge on the respective panel attached to each respective fan blade platform.

In any of the aspects or embodiments described above and herein, each respective panel may be electrically insulated from the respective fan blade platform.

In any of the aspects or embodiments described above and herein, the turbine engine may include an inlet guide vane (IGV) stage disposed proximate the compressor inlet, wherein the IGV stage includes an outer radial platform, and the IGV stage outer radial platform forms an IGV outer gas path boundary within the IGV stage, and wherein the particle separation system may be configured to produce the electrostatic charge on the IGV stage outer radial platform.

In any of the aspects or embodiments described above and herein, the particle separation system may be configured to produce the electrostatic charge on an external surface of the nose cone, wherein the electrostatic charge on the external surface of the nose cone may be one of a positive electrostatic charge or a negative electrostatic charge, and the electrostatic charge on the IGV stage outer radial platform may be the other of the positive electrostatic charge or the negative electrostatic charge.

In any of the aspects or embodiments described above and herein, each fan blade in the fan section (FS) includes a platform and the fan blade platforms collectively form a FS inner gas path boundary within the fan section, and the particle separation system is configured to produce the electrostatic charge on the fan blade platforms, and the electrostatic charge on the fan blade platforms may be one of a positive electrostatic charge or a negative electrostatic charge, and the electrostatic charge on the IGV stage outer radial platform may be the other of the positive electrostatic charge or the negative electrostatic charge.

In any of the aspects or embodiments described above and herein, the fan duct may include an inner radial panel proximate the compressor inlet, and the particle separation system may be configured to produce the electrostatic charge on the fan duct inner radial panel.

In any of the aspects or embodiments described above and herein, the particle separation system may be configured to produce the electrostatic charge on an external surface of the nose cone, wherein the electrostatic charge on the external surface of the nose cone may be one of a positive electrostatic charge or a negative electrostatic charge, and the electrostatic charge on the fan duct inner radial panel may be the other of the positive electrostatic charge or the negative electrostatic charge.

In any of the aspects or embodiments described above and herein, the particle separation system may be controllable to selectively produce the electrostatic charge.

According to an aspect of the present disclosure, a method of separating particles entrained within an air flow entering a turbine engine is provided. The turbine engine includes a fan section having a plurality of fan blades, a nose cone disposed forward of the fan section, a compressor inlet disposed aft of the fan section, and a fan duct disposed radially outside of the compressor inlet, the method comprising producing a first electrostatic charge on one or more surfaces forward of or adjacent to the compressor inlet, wherein the first electrostatic charge is configured to cause charged particles present within an air flow entering the engine to divert from the compressor inlet and enter the fan duct.

In any of the aspects or embodiments described above and herein, the step of producing the first electrostatic charge on one or more surfaces forward of or adjacent to the compressor inlet may include producing the electrostatic charge on an external surface of the nose cone.

In any of the aspects or embodiments described above and herein, each fan blade in the fan section (FS) may include a platform and the fan blade platforms may collectively form a FS inner gas path boundary within the fan section, and the step of producing the first electrostatic charge on one or more surfaces forward of or adjacent to the compressor inlet may include producing the first electrostatic charge on the fan blade platforms.

In any of the aspects or embodiments described above and herein, the turbine engine may include an inlet guide vane (IGV) stage disposed proximate the compressor inlet, the IGV stage including an outer radial platform, wherein the IGV stage outer radial platform forms an IGV outer gas path boundary within the IGV stage, and the method may include producing a second electrostatic charge on the IGV stage outer radial platform, and the second electrostatic charge is opposite the first electrostatic charge.

In any of the aspects or embodiments described above and herein, the fan duct may include an inner radial panel proximate the compressor inlet, and the method may include producing the second electrostatic charge on the fan duct inner radial panel.

In any of the aspects or embodiments described above and herein, the step of producing the first electrostatic charge on one or more surfaces forward of or adjacent to the compressor inlet may include controlling the production of the first electrostatic charge between an on mode wherein the first electrostatic charge is produced and an off mode wherein the first electrostatic charge is not produced.

In any of the aspects or embodiments described above and herein, the one or more surfaces forward of or adjacent to the compressor inlet may include first surfaces and second surfaces, and the step of producing the first electrostatic charge on one or more surfaces forward of or adjacent to the compressor inlet consists of producing the first electrostatic charge on one or more first surfaces forward of or adjacent to the compressor inlet, and the method may include producing a second electrostatic charge on the second surfaces, wherein the second electrostatic charge is opposite the first electrostatic charge.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
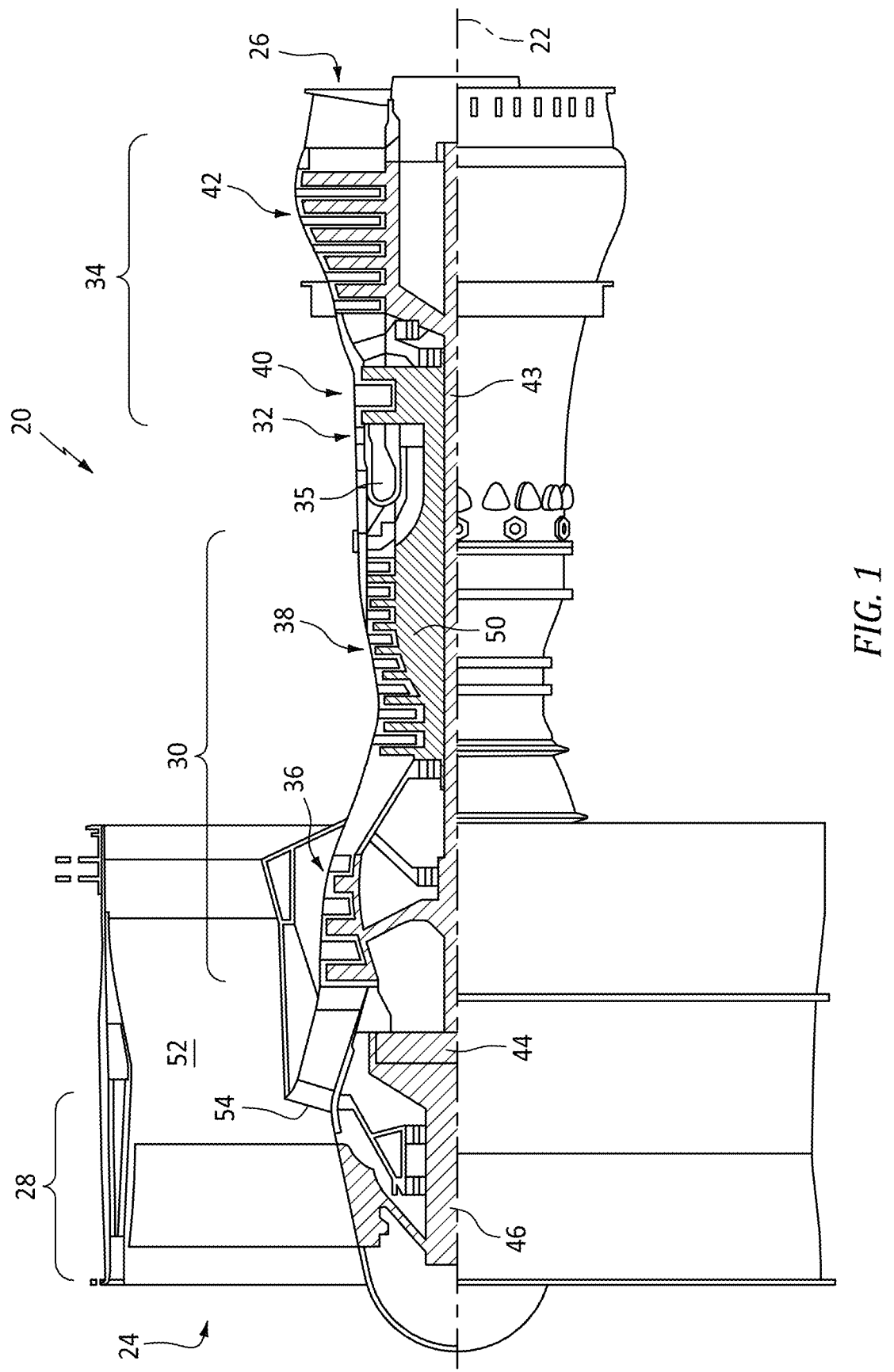
FIG. 1 is a diagrammatic sectional view of a gas turbine engine embodiment.

FIG. 1 shows a partially sectioned diagrammatic view of a geared gas turbine engine 20. The gas turbine engine 20 extends along an axial centerline 22 between an upstream airflow inlet 24 and a downstream airflow exhaust 26. The gas turbine engine 20 includes a fan section 28, a compressor section 30, a combustor section 32, and a turbine section 34. In the illustrative example of FIG. 1, the combustor section 32 includes an annular combustor 35. The compressor section 30 includes a low-pressure compressor (LPC) 36 and a high-pressure compressor (HPC) 38. The turbine section 34 includes a high-pressure turbine (HPT) 40 and a low-pressure turbine (LPT) 42. The engine sections are arranged sequentially along the centerline 22. The fan section 28 is connected to a geared architecture 44, for example, through a fan shaft 46. The geared architecture 44 and the LPC 36 are connected to and driven by the LPT 42 through a low-speed shaft 48. The HPC 38 is connected to and driven by the HPT 40 through a high-speed shaft 50. FIG. 1 diagrammatically illustrates a fan duct 52 disposed outside of a portion of the compressor section 30 of the engine 20; e.g., the engine shown in FIG. 1 may be described as having a "turbofan" configuration. To facilitate the view, the fan duct 52 is only partially shown. Air entering the engine 20 through the airflow inlet 24 is worked by the fan section 28. A portion of that worked air ("bypass air") passes through the fan duct 52 and provides a portion of the thrust produced by the engine 20. The remainder of the air worked by the fan section 28 enters a compressor inlet 54, subsequently entering the compressor section 30. The terms "forward", "leading", "aft", and "trailing" are used herein to indicate the relative position of a component or surface. As air passes through the engine 20, a "leading edge" of a stator vane or rotor blade encounters the air before the "trailing edge" of the same. In a conventional axial engine such as that shown in FIG. 1, the fan section 28 is "forward" of the compressor section 30 and the turbine section 34 is "aft" of the compressor section 30. The terms "inner radial" and "outer radial" refer to relative radial positions from the engine centerline 22. An inner radial component or path is disposed radially closer to the engine centerline 22 than an outer radial component or path.

The gas turbine engine 20 diagrammatically shown in FIG. 1 is an example provided to facilitate the description herein. The present disclosure is not limited to any particular gas turbine engine configuration having a bypass air configuration, including the two-spool engine configuration shown, and may be utilized with single spool gas turbine engines as well as three spool gas turbine engines and the like.

Embodiments of the present disclosure include a particle separation system 56 (e.g., see FIG. 2) that utilizes electrostatic charge to divert particles entrained within an air flow entering the engine 20 into the fan duct 52 and away from a core gas path extending through the engine 20. The core gas path, as that term is used herein, refers to a gas path that extends through the compressor section 30, the combustor section 32, the turbine section 34 and out of the engine 20 through the airflow exhaust 26. Air is worked within the compressor section 30 to a higher pressure and temperature. Within the combustor section 32, fuel is added to the air and the mixture is combusted. Some amount of air and combustion products (collectively referred to as "core gas") exits the combustor section 32 and enters the turbine section 34, where it powers turbine stages within the turbine section 34. Not all of the air that enters the compressor section 30 passes into the combustor section 32. Some amount of air leaks out of the compressor section 30 and some amount of air may be purposefully bled off of the compressor section 30. The leakage air and the bled air may be used for beneficial purposes such as, but not limited to, cooling within the combustor section 32 and the turbine section 34. Air used for cooling often is routed through cooling apertures and/or passages having relatively small cross-sectional areas. These cooling apertures and/or passages are prone to clogging or surface coating that can detrimentally affect heat transfer. The present disclosure provides a solution that can mitigate these undesirable effects.

Figure 2:
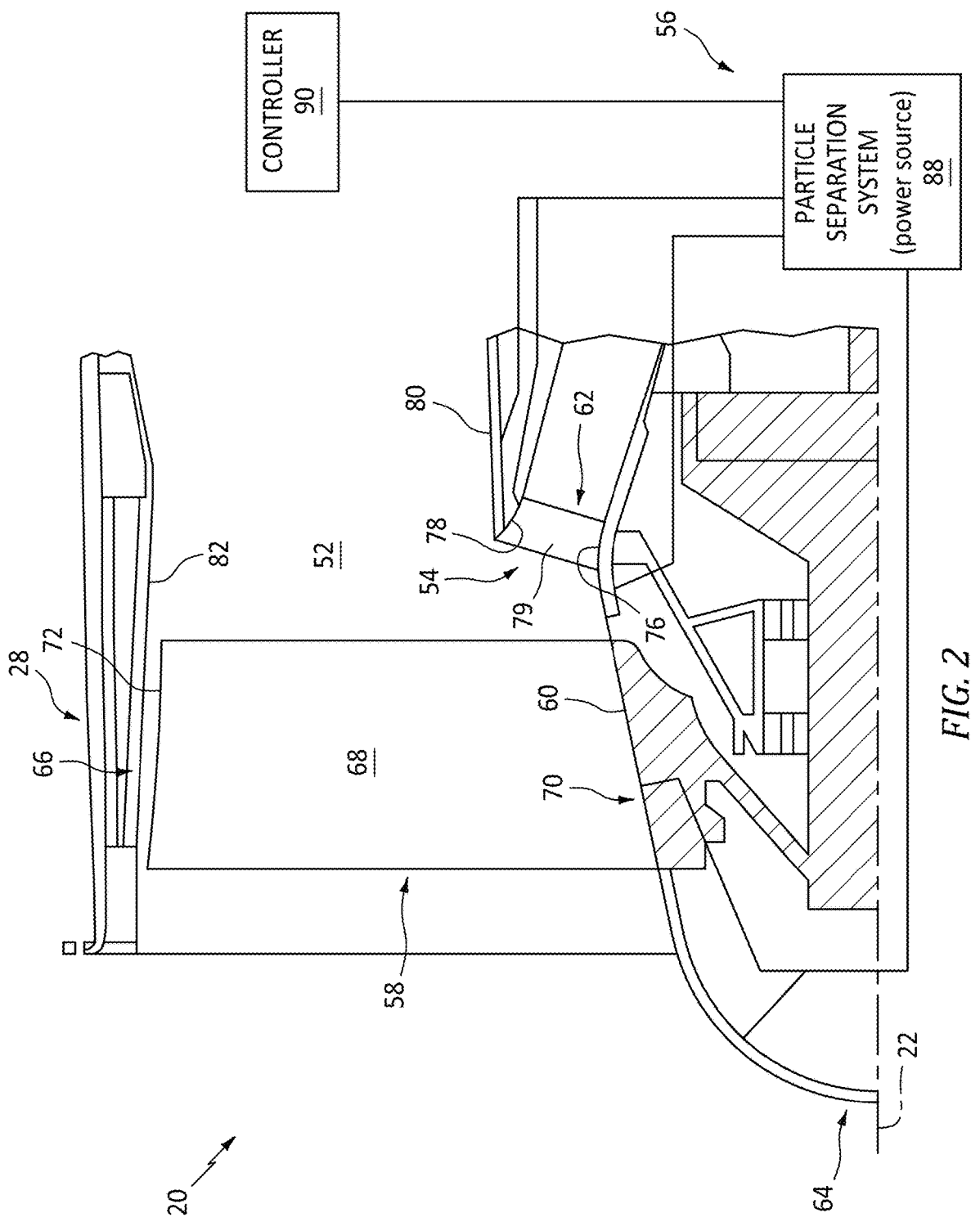
FIG. 2 is an expanded partial view of the turbine engine shown in FIG. 1.
Figure 3:
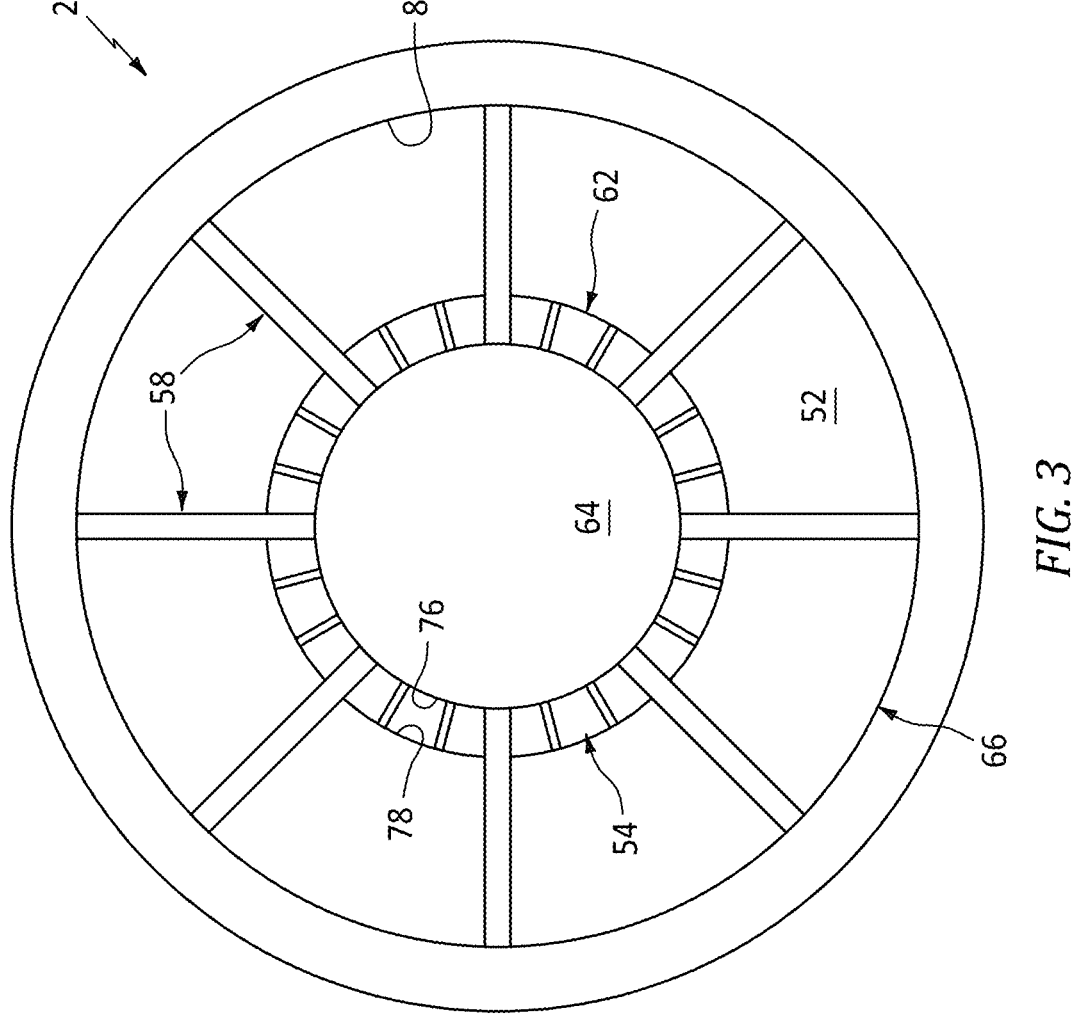
FIG. 3 is a diagrammatic end view of a turbine engine looking down the rotational axis of the engine from forward to aft.
Figures 4, 5:
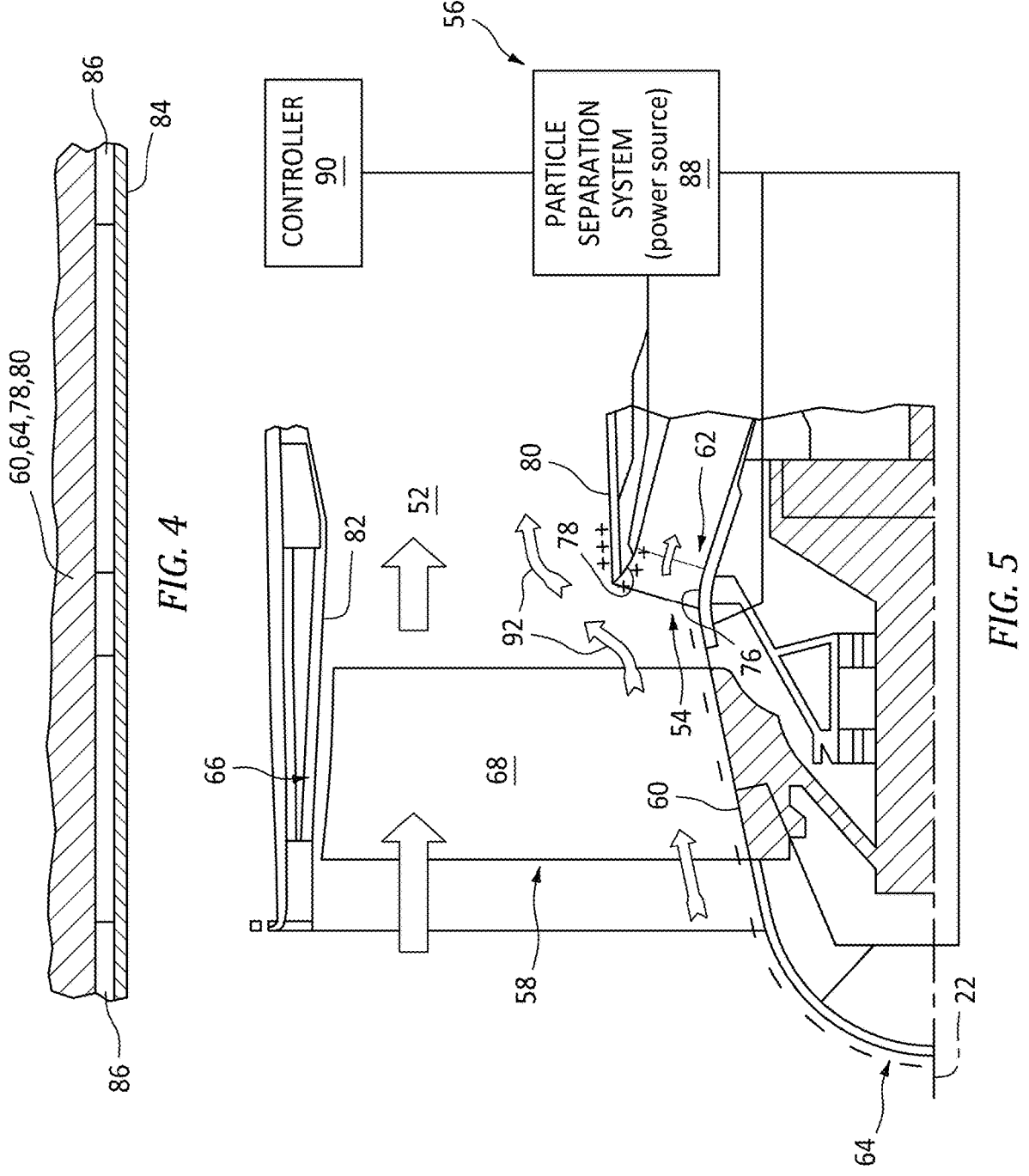
FIG. 4 is a diagrammatic view of an engine component with an electrically conductive surface panel attached to the component surface.
FIG. 5 illustrates the view shown in FIG. 2, with electrically charged surfaces diagrammatically depicted.
Figure 6:
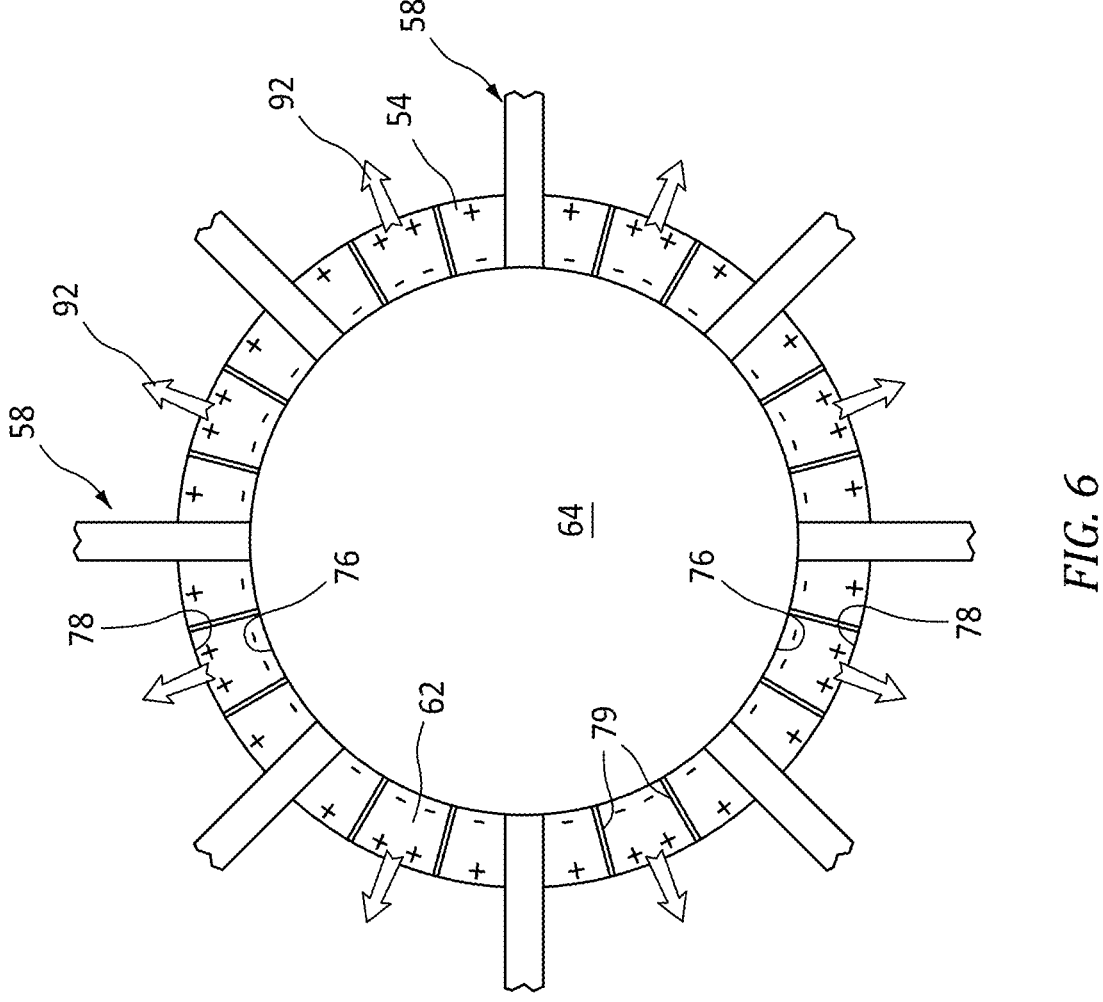
FIG. 6 illustrates an expanded portion of the view shown in FIG. 3, with electrically charged surfaces diagrammatically depicted.
Figures 7, 8:
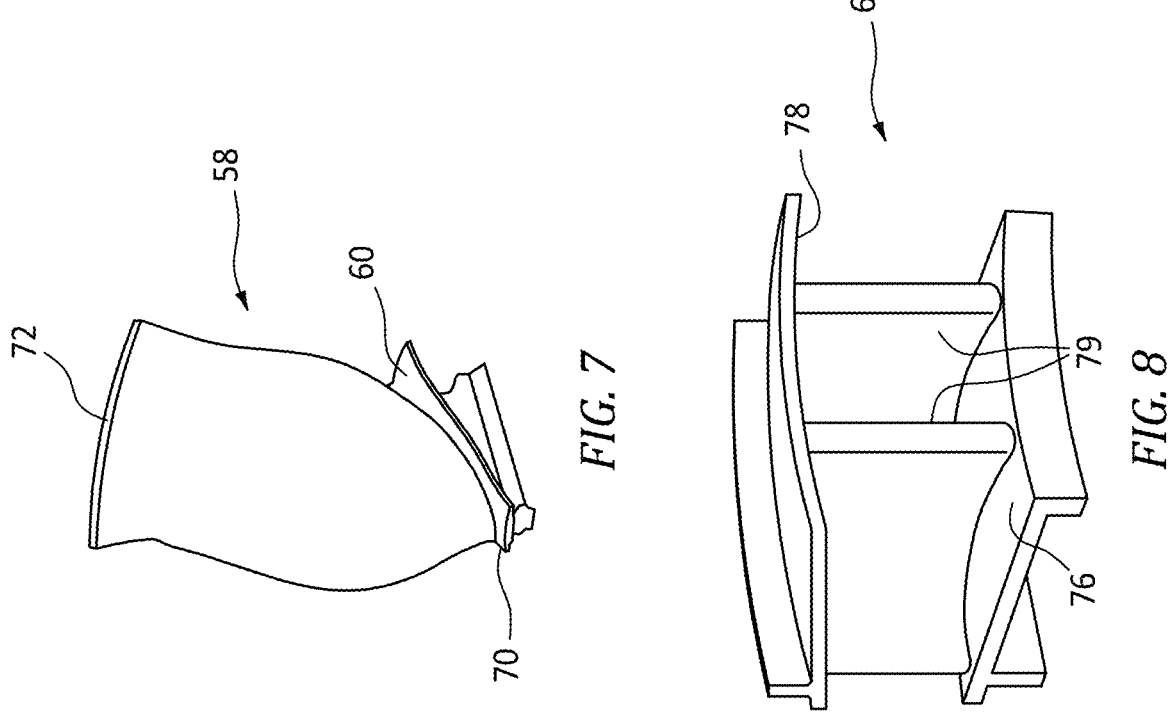
FIG. 7 generically illustrates a fan blade with a platform.
FIG. 8 generically illustrates a vane couple with inner and outer radial platforms.

Referring to FIGS. 2-6, embodiments of the present disclosure are configured with electrically charged surfaces disposed at the airflow inlet 24 of the engine 20. FIGS. 2-4 diagrammatically illustrate components that may include electrically charged surfaces. FIG. 2 is an expanded partial view of the turbine engine shown in FIG. 1 and FIG. 3 is a diagrammatic end view of a turbine engine 20 looking down the rotational axis of the engine from forward to aft. FIG. 5 illustrates the view shown in FIG. 2, now with electrically charged surfaces diagrammatically depicted. FIG. 6 illustrates an expanded portion of the view shown in FIG. 3, now with electrically charged surfaces diagrammatically depicted. FIG. 7 generically illustrates a fan blade 58 with a platform 60. FIG. 8 generically illustrates a portion of a guide vane stage 62 with inner and outer radial platforms.

As can be seen in FIGS. 2 and 3, the engine airflow inlet 24 includes a nose cone 64 (sometimes referred to as a "spinner"), a fan section rotor stage 66, a fan duct 52, a compressor inlet 54, and a compressor inlet guide vane (IGV) stage 62. The nose cone 64 may be connected to the fan section rotor stage 66 and therefore rotationally driven with the fan section rotor stage 66. The fan section rotor stage 66 includes a plurality of fan blades 58. Each fan blade 58 includes an airfoil 68 that extends radially between a platform end 70 and a blade tip 72. At the platform end 70, the fan blade 58 typically includes a platform 60 that extends outward on both lateral sides of the airfoil 68. Collectively, the fan blade platforms 60 form an inner gas path boundary for air passing through the fan section 28.

The compressor inlet guide vane (IGV) stage 62 includes an IGV inner radial platform 76 and an IGV outer radial platform 78 and vanes 79 extending therebetween. The IGV inner and outer radial platforms 76, 78 form inner and outer radial gas path boundaries through the IGV stage 62. In some embodiments, the IGV stage 62 includes a plurality of IGVs (which may be singles, or doublets, or the like) that collectively form the IGV stage 62. Each IGV may include an airfoil, an inner radial platform, and an outer radial platform. The inner and outer radial platforms of each IGV collectively form the IGV stage inner and outer radial platforms 76, 78. In some engine embodiments, gas path panels (not shown) may be used to define the inner and outer radial boundaries of the compressor inlet 54 in combination with the IGV stage 62. The present disclosure is not limited to any particular compressor inlet 54 configuration. An annular fan duct inner radial panel 80 intersects with and is disposed radially outside of the outer compressor gas path boundary components. A fan casing 82 is disposed radially outside of the fan section rotor stage 66. The fan casing 82 extends axially towards the aft end of the engine 20 and is disposed radially outside of the fan duct inner radial panel 80. Proximate the forward end of the engine 20, the fan duct 52 is defined by the fan casing 82 and the fan duct inner radial panel 80.

Particles entrained in air very often possess a static charge (positive or negative electrical charge). In some instances, "small" particles (i.e., those having a diameter/hydraulic diameter less than fifty microns—50 μm) may possess a negative charge and "large" particles (i.e., those having a diameter/hydraulic diameter greater than fifty microns—50 μm) may possess a positive charge. In other instances, the converse may be true; i.e., "small" particles may possess a positive charge and "large" particles may possess a negative charge. The aforesaid static charge may result from contact between the particles and other objects; e.g., other particles and/or surfaces. Embodiments of the present disclosure leverage the static charge of the entrained particles to direct particles away from the portion of the air entering the core gas path of the engine 20 and into the portion of the air entering the fan duct 52. In this manner, the present disclosure desirably decreases the amount of particulate matter entering the core gas path and consequently decreases the detrimental effects associated therewith.

Embodiments of the present disclosure include surfaces that are configured to be electrostatically charged; i.e., a polarity produced by an electrical potential. For example, the exterior surfaces of one or more of the nose cone 64, the fan blade platforms 60, the compressor IGV outer platform 78, the fan duct inner radial panel 80, and any other gas path surfaces proximate the compressor inlet 54, and any combination thereof, may be electrostatically charged; e.g., see FIGS. 5 and 6. The exterior surfaces referred to are those exterior surfaces that are contiguous with air flow. Each respective component surface that is electrostatically charged may result from all or a portion of the respective component being electrostatically charged (i.e., the entire component is electrically charged/subject to an electrical potential), or an electrically conductive panel 84 may be attached to the respective component 60, 64, 78, 80; e.g., see FIG. 4. In those instances wherein an electrically conductive panel 84 is attached to the respective component 60, 64, 78, 80, electrical insulation 86 may be disposed between the component 60, 64, 78, 80 and the electrically conductive panel 84. An electrically conductive panel attached to, and electrically insulated from, a respective component 60, 64, 78, 80 is understood to be useful when the component is electrically non-conductive or in instances where the component cannot be electrically isolated.

Embodiments of the present disclosure may include a power source 88 configured to provide the electrostatic charge to the exterior surface. The power source 88 is configured to produce an electrical potential sufficient to produce the desired electrostatic motive force utilized to divert charged particles entrained within the air flow. Any power source 88 that can produce an electrical potential sufficient to divert a substantial percentage of charged particles entrained within the air flow may be used. For most turbine engine operations, it is understood that a power source 88 that can produce an electrical potential in the range of about 50,000 volts to about 200,000 volts would be sufficient. However, the present disclosure is not limited to this range, and the power source 88 could produce an electrical potential greater or less than the stated range. The present disclosure is not limited to using any particular power source 88. In some embodiments, the power source

88 may include one or more of a coil, a transformer, a Van de Graff generator, a Tesla coil, or the like. The component having the exterior surface, or the electrically conductive surface panel attached to the component, may be connected to the power source 88 in a variety of different ways. As an example, a rotating component may be electrically connected using a brush connection or a sliding contact connection. The present disclosure is not limited to any particular electrical connection mechanism.

The power source 88 may be in communication with a controller 90 configured to control the application of the electrostatic charge. For example, the power source 88 may be controlled between an "on mode" wherein the portion is electrostatically charged and an "off mode" wherein the portion is not electrostatically charged to prevent particle accumulation on the charged portion. The controller 90 may be configured to control and/or receive signals from whatever system components are used to perform the functions described herein. The controller 90 may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system to accomplish the same algorithmically and/or coordination of system components. The controller 90 includes or is in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. Communications between the controller 90 and other system components may be via a hardwire connection or via a wireless connection.

In the operation of a turbine engine 20, air is drawn into the engine 20 through the airflow inlet 24 and is directed through the fan section 28. A portion of the inlet air passes into the core gas path, and the remainder passes into the fan duct 52. The potential for particulate contamination within the inlet air is typically greatest when the engine 20 is idling with the aircraft stationary, during taxiing, during takeoff, and during landing due to the higher concentration of particles entrained within the air near the ground, and the propensity of the engine inlet air flow to disturb the ground (e.g., via vortical flow) and cause particulate entrainment.

The present disclosure system may be controllable to operate the particle separation system 56 the entire time the engine 20 is operating, or it may be controllable to operate the particle separation system 56 during select time periods when the engine 20 is operating; e.g., the particle separation system 56 may be operated when the engine 20 is idling with the aircraft stationary, or during taxiing, takeoff, or landing, or any combination thereof. In some embodiments of the present disclosure, sensors configured to sense the concentration of particulate entrainment may be included, and the particle separation system 56 may be operated when the concentration of particulate entrainment exceeds a predetermined threshold.

When the particle separation system 56 is in an "on mode", the power source 88 is controlled to subject the component 60, 64, 78, 80 (or electrically conductive panel 84) to an electrical potential that creates the aforesaid electrostatically charged surface. In the example diagrammatically shown in FIGS. 5 and 6, the system 56 causes the nose cone 64, the fan blade platform 60 surfaces, the compressor IGV outer radial platform 78, and/or the fan duct inner radial panel 80 to have an electrostatic charge. In this example, the nose cone 64 and the fan blade platform 60 are diagrammatically shown as having a negative electrostatic charge, and the compressor IGV outer radial platform 78 and the fan duct inner radial panel 80 are diagrammatically shown as having a positive electrostatic charge. Hence, causing the nose cone 64 and the fan blade platform 60 to have a negative electrostatic charge will create a electrostatic repulsive force that acts on negatively charged particles entrained within the air flow, and causing the compressor IGV outer radial platform 78 and the fan duct inner radial panel 80 to have a positive electrostatic charge will create an electrostatic attractive force that acts on those negatively charged particles entrained within the air flow. The electrostatic repulsive and attractive forces will collectively divert negatively charged particles away from the compressor inlet 54 and into the fan duct 52 (symbolically shown by arrow 92).

As indicated above, in some instances "small" particles (i.e., those having a diameter/hydraulic diameter less than fifty microns—50 μm) may typically possess a negative charge and "large" particles (i.e., those having a diameter/hydraulic diameter greater than fifty microns—50 μm) may typically possess a positive charge, or vice versa. Embodiments of the present disclosure can be controlled to produce electrostatic repulsive and attractive forces based on the entrained particulates likely to be present, and in any instance wherein particulate electrostatic charge is a function of particulate size, may be controlled to preferentially separate particulates as a function of particulate size. For example, under some operational scenarios it may be desirable to divert larger particles into the fan duct 52 rather than smaller particles. In such a case, an electrostatic charge configuration for the engine components may be chosen that diverts desired entrained larger particles into the fan duct 52.

As stated above, the present disclosure system may be controllable to operate the particle separation system 56 the entire time the engine 20 is operating or during select time periods. The present disclosure system may also be controllable to operate the particle separation system 56 selectively between the "on mode" and the "off mode" to prevent build-up and cause release of any particles that may adhere to a respective surface as a result of electrostatic charge. In some embodiments, the particle separation system 56 may be controllable to selectively vary the magnitude of the electrical potential applied to a component (or panel). For example, during certain operating conditions (e.g., a larger concentration of particles entrained within the air flow) the system 56 may be controlled to utilize a larger electrical potential/electrostatic charge to increase the electrostatic repulsive and attractive forces and the resultant collective diverting force, or conversely the system 56 may be controlled to use a smaller electrical potential/electrostatic charge to decrease the electrostatic repulsive and attractive forces and the resultant collective diverting force. In some embodiments, the particle separation system 56 may be controllable to subject only some component surfaces (or panels) to possess an electrostatic charge. For example, under certain environmental conditions it may be useful to only apply a electrical potential/electrostatic charge to the nose cone 64 and/or the fan blade platforms 60; e.g., the electrostatic repulsive forces associated therewith may be adequate to cause the desired particle diversion into the fan duct 52.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible.

The invention claimed is:

1. A turbine engine, comprising:
   a fan section (FS) having a plurality of fan blades disposed around a circumference of the FS;
   a nose cone disposed forward of the FS;
   a compressor inlet disposed aft of the FS;
   a fan duct disposed radially outside of the compressor inlet; and
   a particle separation system configured to produce a first electrostatic charge on continuous surfaces of the nose cone and the FS, extending to an inner radial boundary of the compressor inlet, and configured to produce a second electrostatic charge on one or more surfaces proximate to an outer radial boundary of the compressor inlet;
   wherein the second electrostatic charge is opposite the first electrostatic charge; and
   wherein the first electrostatic charge and the second electrostatic charge are configured to cause charged particles present within an air flow entering the engine to divert from the compressor inlet and enter the fan duct.

2. The turbine engine of claim 1, wherein the particle separation system is configured to produce the first electrostatic charge on an external surface of the nose cone.

3. The turbine engine of claim 1, wherein the particle separation system is configured to produce the first electrostatic charge on a panel attached to the nose cone.

4. The turbine engine of claim 3, wherein the panel is electrically insulated from the nose cone.

5. The turbine engine of claim 1, wherein each fan blade in the FS includes a platform and the fan blade platforms collectively form a FS inner gas path boundary within the FS; and
   wherein the particle separation system is configured to produce the first electrostatic charge on the fan blade platforms.

6. The turbine engine of claim 1, wherein each fan blade in the FS includes a platform and a respective panel attached to each respective fan blade platform; and
   wherein the particle separation system is configured to produce the first electrostatic charge on the respective panel attached to each respective fan blade platform.

7. The turbine engine of claim 6, wherein each respective panel is electrically insulated from the respective fan blade platform.

8. The turbine engine of claim 1, further comprising an inlet guide vane (IGV) stage disposed proximate the compressor inlet, the IGV stage includes an outer radial platform, wherein the IGV stage outer radial platform forms an IGV outer gas path boundary within the IGV stage;

wherein the particle separation system is configured to produce the second electrostatic charge on the IGV stage outer radial platform.

9. The turbine engine of claim 8, wherein the particle separation system is configured to produce the first electrostatic charge on an external surface of the nose cone, wherein the first electrostatic charge on the external surface of the nose cone is one of a positive electrostatic charge or a negative electrostatic charge, and the second electrostatic charge on the IGV stage outer radial platform is the other of the positive electrostatic charge or the negative electrostatic charge.

10. The turbine engine of claim 8, wherein each fan blade in the FS includes a platform and the fan blade platforms collectively form a FS inner gas path boundary within the FS and the particle separation system is configured to produce the first electrostatic charge on the fan blade platforms;

wherein the first electrostatic charge on the fan blade platforms is one of a positive electrostatic charge or a negative electrostatic charge, and the second electrostatic charge on the IGV stage outer radial platform is the other of the positive electrostatic charge or the negative electrostatic charge.

11. The turbine engine of claim 1, wherein the fan duct comprises an inner radial panel proximate the compressor inlet;

wherein the particle separation system is configured to produce the second electrostatic charge on the fan duct inner radial panel.

12. The turbine engine of claim 11, wherein the particle separation system is configured to produce the first electrostatic charge on an external surface of the nose cone, wherein the first the electrostatic charge on the external surface of the nose cone is one of a positive electrostatic charge or a negative electrostatic charge, and the second electrostatic charge on the fan duct inner radial panel is the other of the positive electrostatic charge or the negative electrostatic charge.

13. The turbine engine of claim 1, wherein the particle separation system is controllable to selectively produce the first electrostatic charge and the second electrostatic charge.

14. A method of separating particles entrained within an air flow entering a turbine engine, the turbine engine including a fan section (FS) having a plurality of fan blades, a nose cone disposed forward of the FS a compressor inlet disposed aft of the FS and a fan duct disposed radially outside of the compressor inlet, the method comprising:

producing a first electrostatic charge on continuous surfaces of the nose cone and the FS, extending to an inner radial boundary of the compressor inlet; and producing a second electrostatic charge on one or more surfaces proximate to an outer radial boundary of the compressor inlet, wherein the second electrostatic charge is opposite the first electrostatic charge;

wherein the first electrostatic charge and the second electrostatic charge are configured to cause charged particles present within an air flow entering the engine to divert from the compressor inlet and enter the fan duct.

15. The method of claim 14, wherein the step of producing the first electrostatic charge includes producing the first electrostatic charge on an external surface of the nose cone.

16. The method of claim 15, wherein each fan blade in the FS includes a platform and the fan blade platforms collectively form a FS inner gas path boundary within the FS; and wherein the step of producing the first electrostatic charge includes producing the first electrostatic charge on the fan blade platforms.

17. The method of claim 16, wherein the turbine engine further includes an inlet guide vane (IGV) stage disposed proximate the compressor inlet, the IGV stage including an outer radial platform, wherein the IGV stage outer radial platform forms an IGV outer gas path boundary within the IGV stage;

wherein the step of producing the second electrostatic charge includes producing the second electrostatic charge on the IGV stage outer radial platform.

18. The method of claim 17, wherein the fan duct includes an inner radial panel proximate the compressor inlet; and wherein the step of producing the second electrostatic charge includes producing the second electrostatic charge on the fan duct inner radial panel.

19. The method of claim 14, wherein the step of producing the first electrostatic charge includes controlling the production of the first electrostatic charge between an on mode wherein the first electrostatic charge is produced and an off mode wherein the first electrostatic charge is not produced.

* * * * *